United States Patent [19]

Corghi

[11] Patent Number: 5,589,927
[45] Date of Patent: Dec. 31, 1996

[54] SYSTEM FOR MEASURING THE WHEEL BASE OF AN AUTOMOBILE FRAME AND THE TRANSVERSE AND LONGITUDINAL OFFSETS OF ITS STEERED WHEELS

[75] Inventor: Remo Corghi, Correggio, Italy

[73] Assignee: Corghi, S.p.A., Strada Statale, Italy

[21] Appl. No.: 180,327

[22] Filed: Jan. 12, 1994

[30] Foreign Application Priority Data

Feb. 16, 1993 [IT] Italy ................... RE93A0014

[51] Int. Cl.⁶ .............. G01C 3/00; G01B 11/26; G01B 5/24
[52] U.S. Cl. ............. 356/3.12; 33/203.18; 356/139.09
[58] Field of Search .................. 356/139.09, 141.3, 356/141.1, 152.1, 155, 3.1, 3.11, 3.12, 4.03; 33/288, 203.15, 203.18

[56] References Cited

U.S. PATENT DOCUMENTS

| | | |
|---|---|---|
| 4,154,531 | 5/1979 | Roberts, Jr. ................. 356/155 |
| 4,257,703 | 3/1981 | Goodrich . |
| 4,302,104 | 11/1981 | Hunter . |
| 4,311,386 | 1/1982 | Coetsier .................. 356/155 |
| 4,319,838 | 3/1982 | Grossman et al. . |
| 4,336,658 | 6/1982 | January et al. ............ 33/288 |
| 4,338,027 | 7/1982 | Eck . |
| 5,018,853 | 5/1991 | Hechel et al. ............ 356/155 |
| 5,168,632 | 12/1992 | Rimlinger, Jr. ............ 33/288 |
| 5,208,647 | 5/1993 | Longa et al. . |
| 5,488,471 | 1/1996 | McClenahan et al. ....... 356/139.09 |

FOREIGN PATENT DOCUMENTS 0521254  1/1993  European Pat. Off. .

OTHER PUBLICATIONS

4th IECI Annual Conference Proceedings, 20 Mar. 1978, Philadelphia, pp. 99–105, A. K. Chang.

*Primary Examiner*—Stephen C. Buczinski

[57] ABSTRACT

A system for measuring the wheel base of an automobile frame and the transverse and longitudinal offsets of its steered wheels which comprises a first device and a second device to be applied by known means to two automobile frame wheels positioned on the same side, said first device comprising two light emitting diodes (LEDs) located a known distance (d) apart, measured in the horizontal plane, and said second device comprising optical angle measurement means arranged to measure the angle ($\alpha$) subtended between the light rays emitted by said light emitting diodes.

2 Claims, 3 Drawing Sheets

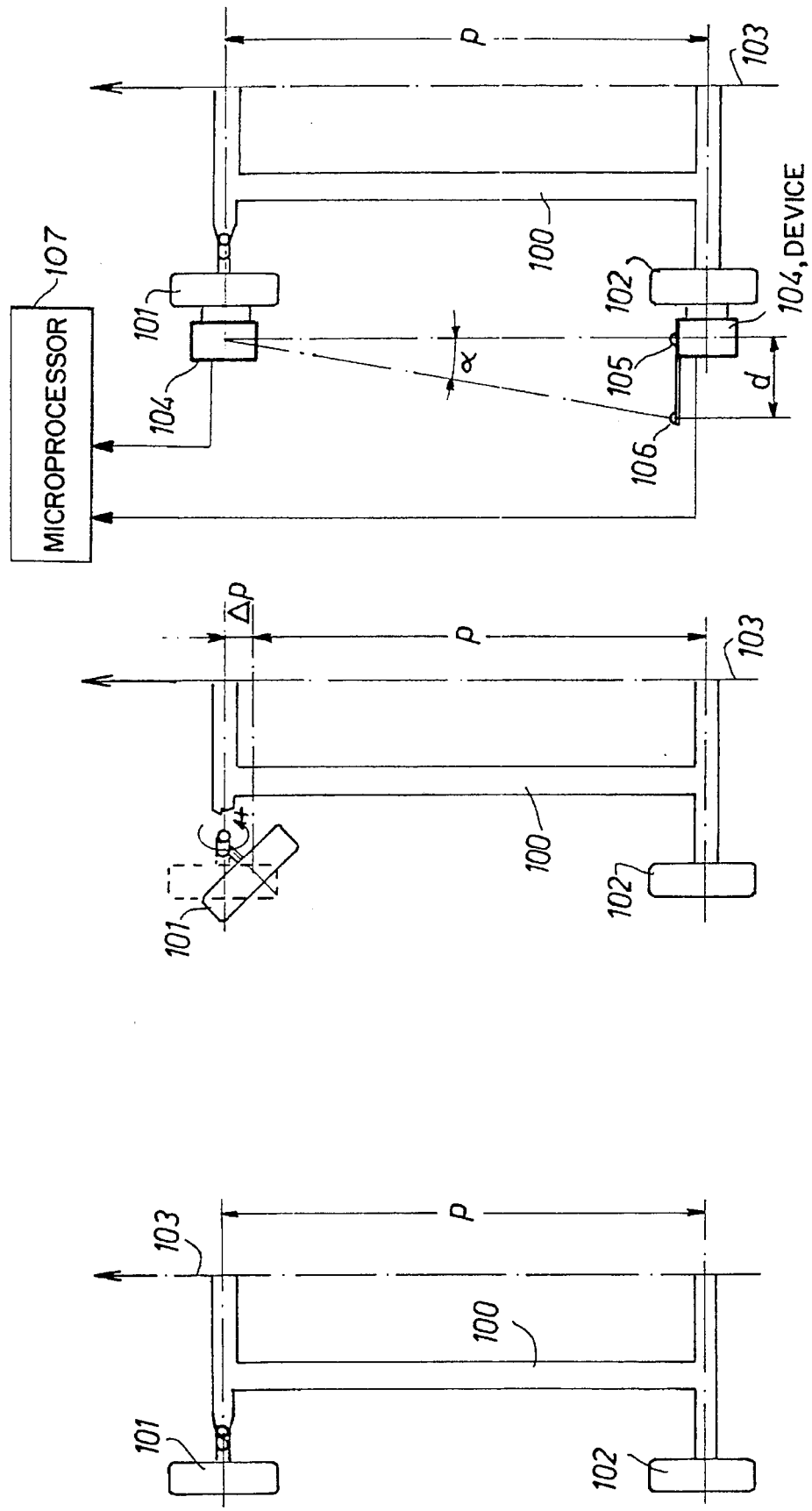

5,589,927

SYSTEM FOR MEASURING THE WHEEL BASE OF AN AUTOMOBILE FRAME AND THE TRANSVERSE AND LONGITUDINAL OFFSETS OF ITS STEERED WHEELS

BACKGROUND OF THE INVENTION

Systems are known for measuring those characteristic attitude angles of the wheels of an automobile frame which enable convergence to be determined and the thrust axis defined.

These known systems use devices comprising, inter alia, light beam emitting means in combination with angle transducer means of the optical type which are fixed to the wheel rims by suitable brackets and interact with the transducers of the adjacent wheels, both on the same side and on the opposing sides of the automobile frame, by feeding and receiving light beams parallel to the equatorial planes of the wheels and measuring the angles of incidence of said beams.

There is however one attitude quantity, depending on its geometrical characteristics, which is not possible to measure by known systems. This quantity is the wheel base, which because of the inclination of the steering axis, varies as the steering angle varies.

It should be noted that the term "steering axis" means the axis about which the overall wheel swivels when steered.

The steering axis is generally inclined both in the transverse plane perpendicular to the automobile frame axis and in the longitudinal plane parallel to said axis.

The inclination is such that the steering axis is generally incident with the surface on which the frame rests at a point external to the equatorial wheel plane, and in front of the point of contact of the diametrical plane with the resting surface in the direction of movement.

The so-called transverse and longitudinal wheel offsets are determined by projecting the distance of the point of incidence from the point of contact into the transverse and longitudinal planes passing through the center of the wheel equatorial plane (wheel center of rotation).

In accordance with well known parameters the values of the wheel offsets determine the directional stability of the automobile frame during both straight and curved movement. As these offsets vary in accordance with the wheel steering angle, as does the wheel base, the corresponding offset variations can be obtained by measuring the wheel base variations as a function of the steering angle. This indicates the importance of being able to measure the wheel base.

SUMMARY OF THE INVENTION

This is precisely the object of the present invention, which is attained by positioning, in known optical measurement devices, two light emitting diodes (LEDs) at a predetermined distance apart in proximity to the same horizontal plane. Using elementary trigonometrical calculations, the wheel base can be determined by measuring the angle between the light beams emitted by said diodes by means of the device applied to the adjacent wheel on the same side of the automobile frame. The wheel offsets can be obtained by extrapolation, by repeating the measurement for different steering angles.

BRIEF DESCRIPTION OF THE DRAWINGS

The merits and the operational and constructional features of the invention will be more apparent from the detailed description given hereinafter with reference to the figures of the accompanying drawings, which show a preferred embodiment thereof by way of non-limiting example.

FIG. 3 is a plan view of the left side of the automobile frame, with the front wheel not undergoing steering.

FIG. 4 shows the left side of the automobile frame, with the front wheel undergoing steering.

FIG. 5 shows the left side of the automobile frame, with the invention applied.

DETAILED DESCRIPTION OF THE INVENTION

Figure 1:
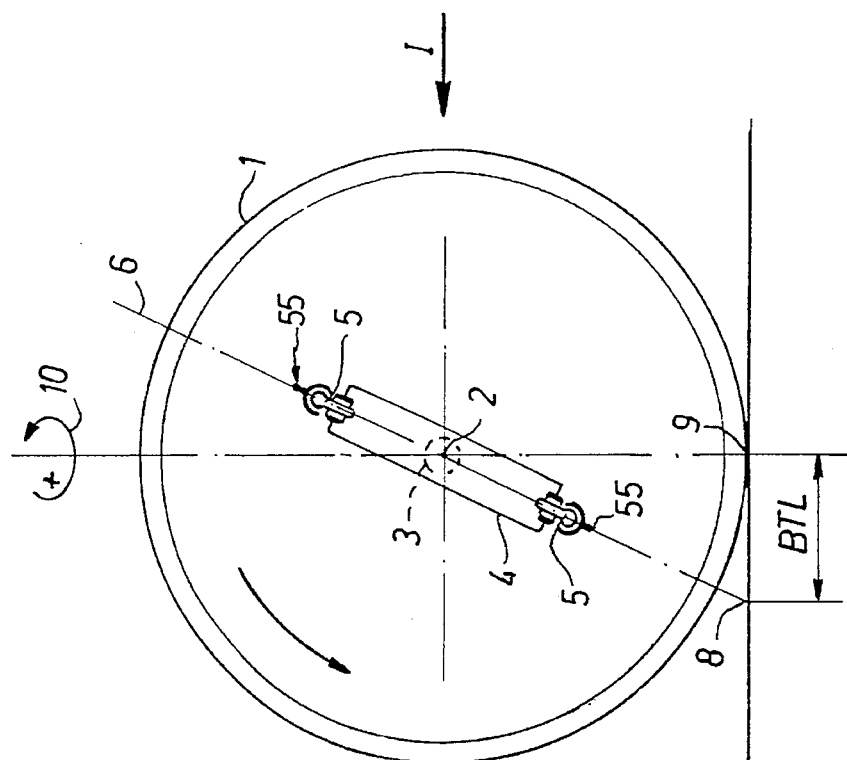
FIG. 1 is a schematic view of a wheel seen from the rear, ie viewed in the travelling direction, ie in the direction I of FIG. 2.

The figures show the wheel 1, the equatorial plane of which is indicated by 11 and which rotates about the axis 2 of a pivot 3 rigid with the member 4.

The fork-shaped member 4 comprises two ball joints 5 located on an inclined axis 6, this being the wheel steering axis 6. The ball joints 5 are positioned at the end of two rocker frames 55 forming the wheel suspension. The member 4 is connected to the steering linkage, not shown.

The projection of the axis 6 onto the wheel steering transverse plane passing through the axis 2, ie in the plane of FIG. 1, encounters the resting surface for the automobile frame (the ground) at a point 7, the distance BTT of which from the equatorial plane 11 represents the transverse wheel offset.

The projection of the axis 6 onto the wheel steering longitudinal plane (perpendicular to the preceding), which substantially coincides with the wheel equatorial plane (the plane of FIG. 2), encounters the resting surface for the automobile frame (the ground) at a point 8, the distance BTL of which from the contact point 9 of the wheel equatorial plane represents the longitudinal wheel offset.

It is clear from the figures that the inclination of the steering axis 6 in both the transverse and longitudinal planes when the wheel is steered results in variations in the attitude of the automobile frame.

Figure 2:
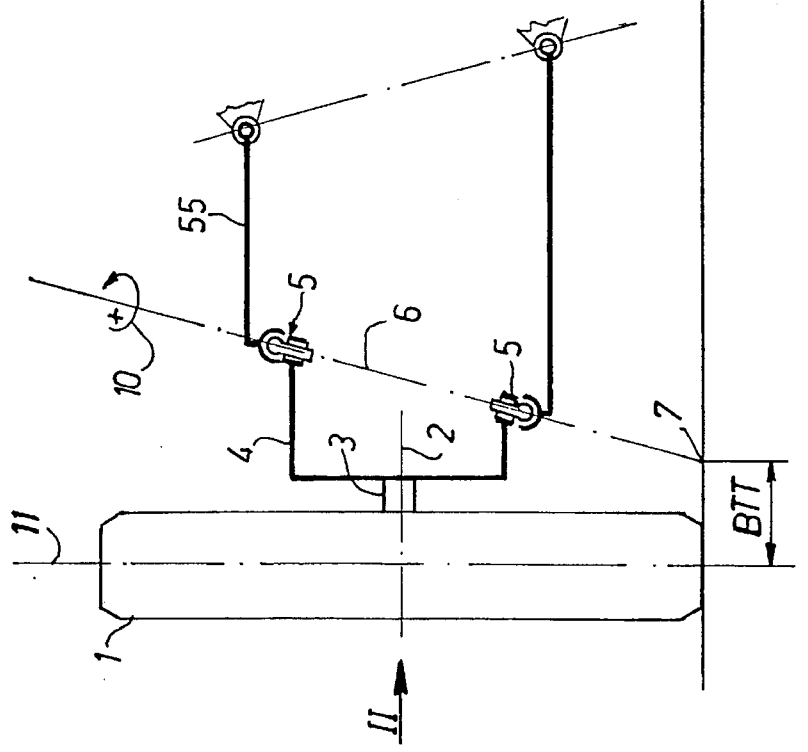
FIG. 2 is a side view thereof, ie in the direction II of FIG. 1.

If the steering angles when the diametrical wheel plane encounters the vehicle longitudinal plane behind the front axle are indicated conventionally as positive, and negative when it encounters the longitudinal plane to the front of the front axle, as indicated by the arrows 10 in FIGS. 1 and 2, it can be seen that for positive steering angles the wheel is lowered relative to the automobile frame (ie the frame rises relative to its resting surface, namely the ground), whereas the opposite happens for negative steering angles.

As the steering angles of the two steered wheels are of opposite sign with the adopted convention, the frame inclines transversely when travelling through a curve. In addition, as the axis of the pivot 3 encounters the steering axis at a point external to the equatorial wheel plane, the transverse and longitudinal offsets (BTT, BTL) also vary when the wheel is steered. FIGS. 3 to 7 show the left side of a automobile frame 100 with a steered front wheel 101 and a non-steered rear wheel 102. The longitudinal axis of the automobile frame is indicated by 103.

A device 104 comprising inter alia two light emitting diodes (LEDs) 105 and 106 is fixed to the rim of the wheel 102 by known means.

The distance between said diodes 105 and 106 in the horizontal plane is indicated by d.

An analogous device 104 of known type able to receive inter alia the light beams emitted by the diodes 105 and 106 and measure the angle between them is fixed to the rim of the wheel 101 by known means.

Figure 7:
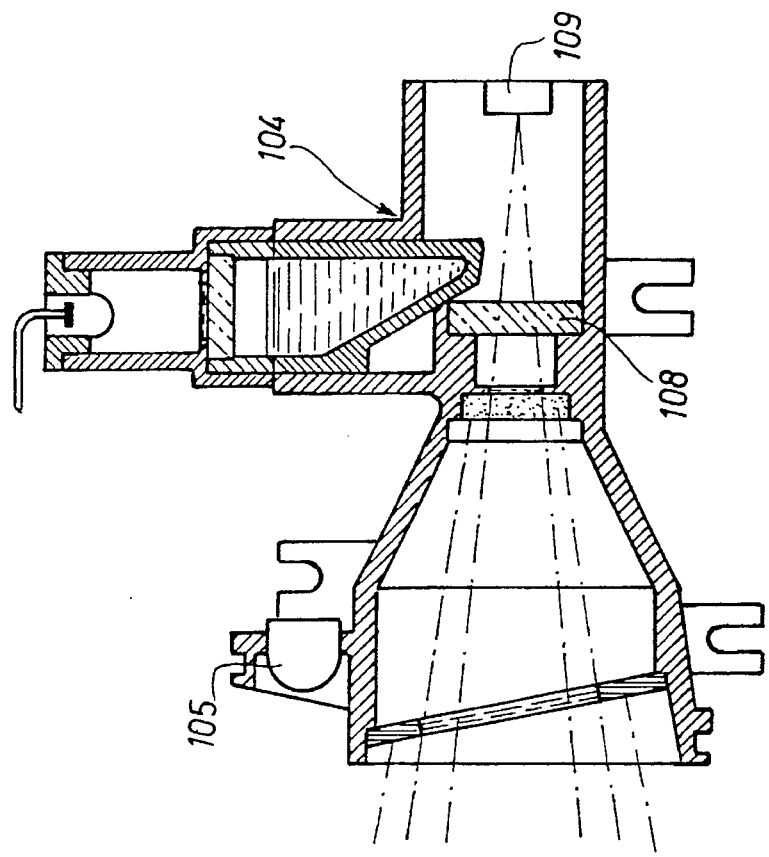
FIG. 7 is a section on the line VII—VII of FIG. 6.
Figure 6:
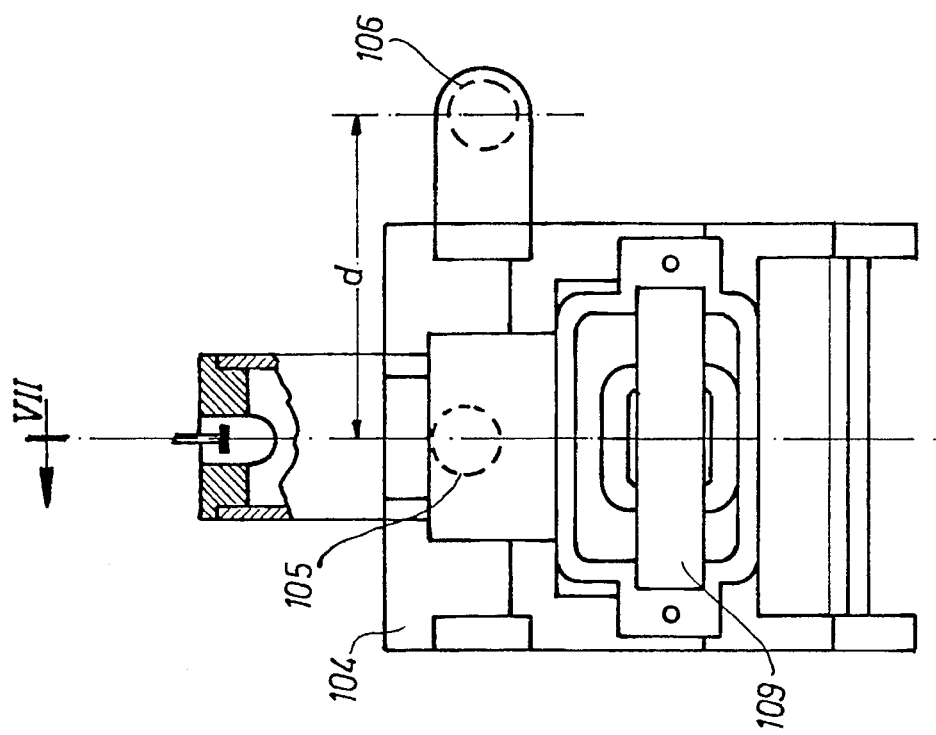
FIG. 6 is a front view showing in greater detail the angle measurement device illustrated in FIG. 5.

Specifically, as shown in FIGS. 6 and 7, the device 104 comprises inter alia at least one cylindrical lens 108 able to concentrate the light beams emitted by the diodes of the device mounted on the adjacent wheel into light planes.

The axis of the cylindrical lens is perpendicular to the plane of FIG. 5 and parallel to the plane of FIGS. 6 and 7.

A line 109 of optical sensors on which the light planes concentrated by the lens fall is positioned in a direction perpendicular to the lens axis.

The distance between the points at which the light planes originating respectively from the diodes 105 and 106 strike the line of sensors 109 is a known function of the angle $\alpha$ which depends on the known geometrical characteristics of device 104.

The angle $\alpha$ can hence be found by processing this information by a microprocessor 107 which receives the signals from the diode line 109.

The same microprocessor 107 then processes the angle on the basis of the known distance d between the diodes 105 and 106, to calculate the wheel base p between the wheels 101 and 102.

As is apparent from FIGS. 3 and 4, the wheel base p is a function of the steering angle, ie as the steering angle varies the wheel base p changes by an amount $\Delta p$.

The relationship governing the variation in $\Delta p$ with the steering angle for a given automobile frame is determined by processing, by interpolation, the $\Delta p$ values for at least two steering angles.

From this the measurement of the wheel offsets BTL and BTT can be obtained knowing the geometrical steering characteristics.

In this respect, the goniometer 104 rigid with that steered wheel for which, for example, it is required to know the transverse offset, is moved about a circumference of radius r the center of which is the point of contact of the wheel steering axis with the ground.

The radius r is given by the sum of:

$r_1$=distance of the goniometer from the outer side of the wheel;

$r_2$=distance between the outer side of the wheel and its equatorial plane of symmetry;

$r_3$=BTT.

As the emitter-goniometer distance is basically equal to the wheel base, by measuring the wheel base variation $\Delta p$ for steering angles 0 and $\beta$, we have:

$$BTT = \frac{\Delta p}{\sin\beta} - r_1 - r_2$$

where $r_1$ and $r_2$ are known geometrical characteristics of the device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for measuring the wheel base of an automobile frame, comprising: a first device and a second device applied to the two automobile frame wheels positioned on the same side, said first device including two light emitting diodes (LEDs) located at a known distance (d) apart, measured in the horizontal plane, said second device including optical angle measurement means arranged to measure an angle ($\alpha$) subtended between light rays emitted by said light emitting diodes, said optical angle measurement means of said second device including at least one cylindrical lens able to concentrate the light beams emitted by said light emitting diodes into light planes; a line of optical sensors arranged perpendicular to the axis of said lens for measuring the distance between the points of incidence of said light planes with said line of sensors; and a microprocessor arranged to calculate the angle ($\alpha$) between said light planes on the basis of the geometrical characteristics of said second device, and to calculate the wheel base of the automobile frame on the basis of the geometrical characteristics of said first and said second device.

2. The system of claim 1, wherein said microprocessor further includes means for calculating transverse and longitudinal offsets of the steered wheels from repeated measurements of the wheel base at different steering angles.

\* \* \* \* \*